United States Patent [19]

Izumi et al.

[11] 4,107,508

[45] Aug. 15, 1978

[54] METHOD AND APPARATUS FOR WELDING USING FILLET-WIRE

[75] Inventors: Sachio Izumi, Kobe; Tamotsu Kotani, Akashi, both of Japan

[73] Assignee: L'Air Liquide, Societe Anonyme pour l'Etude et l'Exploitation des Procedes Georges Claude, Paris, France

[21] Appl. No.: 694,353

[22] Filed: Jun. 9, 1976

[51] Int. Cl.² ............................................ B23K 9/12
[52] U.S. Cl. .................................. 219/137.7; 226/37; 226/178; 219/137.71
[58] Field of Search .................. 219/130, 131 F, 76.1, 219/137.7, 137.71, 124.5; 226/178, 37, 42

[56] References Cited

U.S. PATENT DOCUMENTS

| | | | |
|---|---|---|---|
| 3,562,577 | 2/1971 | Kensrue | 219/130 X |
| 3,644,701 | 2/1972 | Kobayashi et al. | 219/130 |
| 3,652,819 | 3/1972 | Kerr et al. | 219/130 X |

Primary Examiner—J. V. Truhe
Assistant Examiner—M. Paschall
Attorney, Agent, or Firm—Lee C. Robinson, Jr.

[57] ABSTRACT

A method of and apparatus for automatic or semi-automatic welding or brazing wherein a fillet-wire, mechanically fed to the welding position on a work piece, is heated, along with the work piece, by a flame so that the fillet-wire reaches its melting point. A heating current is supplied to the fillet-wire to flow between the wire and the work piece. In order to maintain a predetermined relationship between the rate at which the fillet-wire is fed to the work piece and the rate at which the wire melts and separates to drop onto the work piece, the feed-rate and/or current intensity is regulated such that the wire is in constant contact with the work piece with a predetermined contact pressure. In one embodiment, the mechanical feeding device comprises a torque-limiting mechanism to maintain a substantially constant predetermined contact pressure of the fillet wire against the work piece. The torque-limiting mechanism may be of the slippage-type with two friction clutch-discs driven by a motor shaft, or it may be of the iron-powder type that is electrically operated.

11 Claims, 2 Drawing Figures

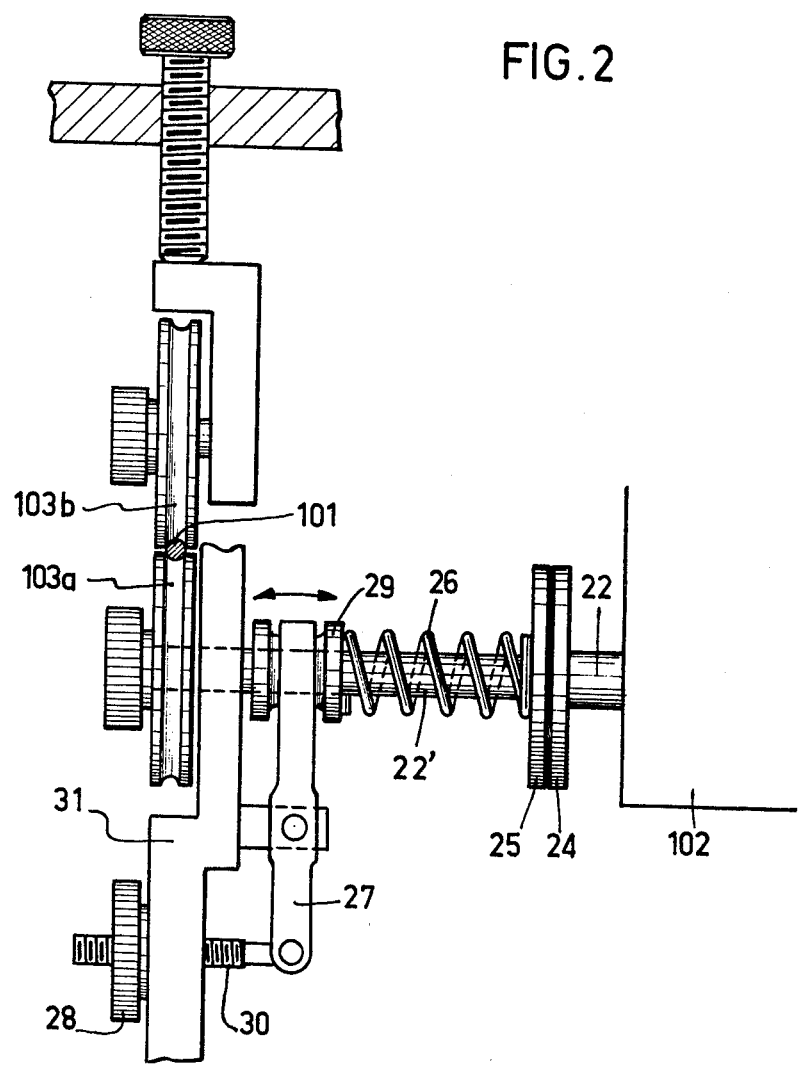

METHOD AND APPARATUS FOR WELDING USING FILLET-WIRE

BACKGROUND OF THE INVENTION

This invention relates to a method of and apparatus for automatic or semi-automatic welding or brazing of the type wherein a fillet-wire, mechanically fed to the point of welding on a work piece, is heated by a flame at the same time as the work piece is heated by the same flame, so that the wire is brought to its melting point, and wherein a short-circuit current passes between the fillet-wire and the work piece so that the Joule effect of the current heats the fillet wire.

In welding or brazing operations, the overall efficiency can be improved by using a short-circuit current through the fillet-wire to assist in heating the wire. The rate at which the wire melts to drop onto the work piece at the welding point is, in part, a function of the intensity of the short-circuit current. Also, the rate at which the fillet-wire is fed to the melting point affects the welding operation. For example, if the feed rate is too slow, the end portion of the wire may melt and detach and fall onto the weld, which is undesirable. Conversely, if the feed rate is too fast, the wire may not have sufficient time to melt; and, moreover, its end portion may undesirably bend when it contacts the work piece. Another disadvantage, which may arise if the feed rate is too slow, as aforementioned, or if the rate at which the molten metal melts is too high, such as by an excessive short-circuit current, is that when the end portion of the fillet-wire falls onto the work piece, an arc may occur therebetween. Such an arc may produce intense arc-light radiation and also, because of the energy of the arc, may impel molten metal, thus creating a hazardous condition. Accordingly, there is a need to maintain equilibrium between the feed rate and melting rate of the fillet-wire.

Furthermore, since many of the aforenoted disadvantages also may be produced if the surface of the work piece includes inequalities, it is desirable to maintain a uniform surface on the workpiece.

OBJECTS OF THE INVENTION

Therefore, it is an object of the present invention to provide an improved method of and apparatus for welding or brazing that overcomes the above-mentioned disadvantages.

Another object of this invention is to provdide a method of and apparatus for welding or brazing wherein a fillet-wire is fed to a welding location at a controllable rate to maintain a balance between the feed rate and melting rate of the wire.

A further object of this invention is to provide a method of and apparatus for welding or brazing wherein a fillet-wire is fed to a welding location at a controllable rate to maintain a substantially constant pressure of the wire against the work piece.

Yet another object of this invention is to provide a method of and apparatus for welding or brazing wherein a short-circuit current passes through a fillet wire fed to a work piece at a welding location, and wherein the current and/or feed rate is controlled to maintain a substantial equilibrium between the rate at which the wire melts and the rate at which it is fed to the work piece.

Various other objects, advantages and features will become readily apparent from the ensuing detailed description, and the novel features will be particularly pointed out in the appended claims.

SUMMARY OF THE INVENTION

A method of and apparatus for welding or brazing is provided, wherein a fillet-wire is fed to a work piece and, additionally, has a heating current flowing through the wire, the feed rate and/or current being regulated such that the end portion of the fillet-wire is in substantially constant contact with the work piece with a pedetermined contact pressure. Accordingly, the end portion of the wire contacts the work piece at a suitable distance from the welding torch and bends only slightly. Thus, welding can be carried out while maintaining an equilibrium between the feed rate of the wire and the rate at which molten metal detaches from the extremity of the wire.

In one embodiment, the feed rate of the wire is regulated by a device comprising a torque-limiting clutch mechanism mounted on the output shaft of a driving motor, whereby slippage occurs in the mechanism when the fillet-wire is subjected to a compression force (contact pressure at the work piece) which exceeds a predetermined value.

BRIEF DESCRIPTION OF THE DRAWINGS

The following detailed description, given by way of example, will best be understood in conjunction with the accompanying drawings, in which:

FIG. 2 is a more detailed view of the fillet-wire feeding mechanism of FIG. 1.

DETAILED DESCRIPTION OF ONE OF THE PREFERRED EMBODIMENTS

Figure 1:
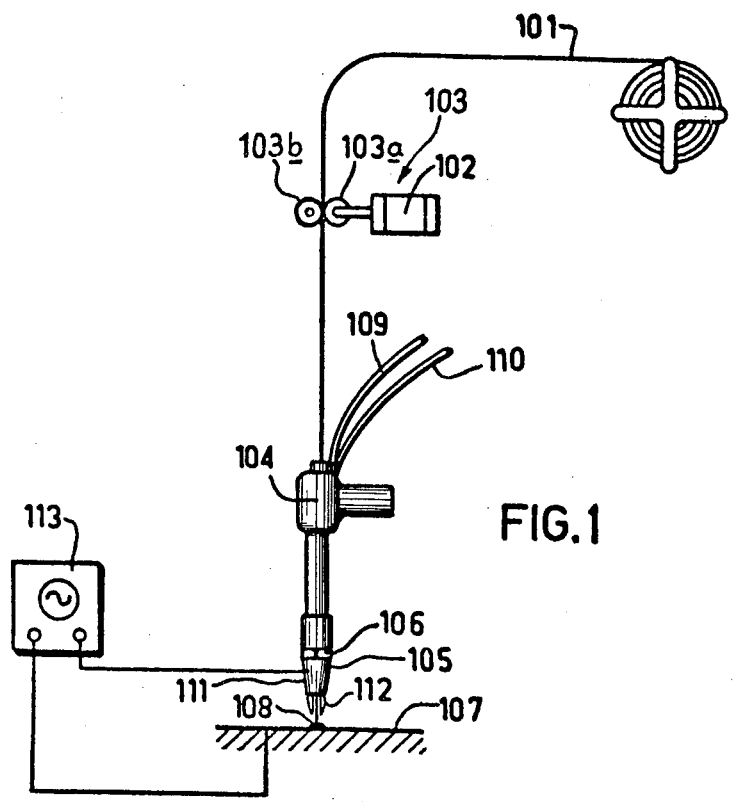
FIG. 1 is a diagrammatic illustration of a welding installation which incorporates the invention.

FIG. 1 illustrates one embodiment of semi-automatic welding apparatus wherein a gas flame is used and wherein an electrical voltage is applied between the nozzle of a welding torch and the work piece to pass current through a fillet-wire. More particularly, a fillet-wire 101 is supplied from, for example, a coil, and is heated and melted by a flame 112 from a nozzle 105 of a torch 104. The molten metal detaches from the wire and is supplied to a welding bead 108 of a work piece 107.

An electric voltage is applied between the nozzle 105 of the torch 104 and the work piece 107 by a source of electrical energy 113, such as an alternating current supply for electric welding. When the fillet-wire 101 is fed into a channel 106 of the torch 104 to electrically contact the nozzle 105, a short-circuit is completed from the source 113, to the nozzle 105 and to the work piece 107 through the wire 101 so that a heating current flows through the fillet-wire 101. Thus, the combination of this heating current and the flame 112 serves to heat the fillet-wire 101 to melt its end portion and weld the work piece 107.

A fillet-wire feed arrangement 103 functions to feed the fillet-wire 101 from its supply to the work piece 107 at the welding location. This arrangement is shown in greater detail in FIG. 2 and comprises a driving motor 102 and a torque-limiting mechanism including clutch or friction discs 24 and 25. The disc 24 is fixed to a drive shaft 22 of the motor 102 and the disc 25 is fixed to a shaft 22' to which a driving roller 103a is secured, the roller 103a cooperating with a counter-roller 103b.

The disc 25 is urged against the disc 24 by a compression spring 26 on the shaft 22', the compression spring being disposed between the disc 25 and a slide 29, thereby to exert a force on the disc 25. The position of the slide 29 along the shaft 22' is controlled by a step-down return lever arm 27 whose opposite end is fixed on a threaded rod 30 engaged in a fixed support plate 31. A knob 28 is provided to adjust the rod 30 and thus the position of the slide 29, thereby to regulate the spring compression force exerted on the disc 25.

The operation of the illustrated embodiment now will be described. If the feed rate of the fillet-wire 101 is higher than the rate at which it melts at the welding location, then the end portion of the wire contacts the work piece 107 with greater pressure. This tends to reduce the speed at which the rollers 103a and 103b rotate. However, assuming that the motor 102 is driven at a constant rate, the disc 25 slips with respect to the disc 24 when the contact pressure of the wire at the work piece exceeds a predetermined value. Preferably, the motor 102 rotates at a speed slightly higher than the normal feed rate of the fillet-wire 101 so that normally there is slippage between the discs 25 and 24. Hence, the end portion of the wire 101 melts while it is fed with a substantially constant predetermined pressure against the work piece 107.

If there is any disturbance to the equilibrium between the feed rate of the fillet-wire 101 and the rate at which the molten metal detaches from the end portion of the wire, proper performance of the welding operation nevertheless can be continued. For example, if the melting rate, i.e., the rate of detachment of the molten metal exceeds the feed rate of the wire 101, the contact pressure of the wire at the work piece is reduced to correspondingly reduce the slippage between the discs 25 and 24, and the feed rate of the fillet-wire tends to increase. Conversely, if the feed rate of the wire exceeds the melting rate, the resultant increase in contact pressure of the wire at the work piece correspondingly increases the slippage between the discs. Hence, the feed rate is properly reduced.

Instead of utilizing a torque limiter of the friction-disc type, in an alternative embodiment a limiter using iron powder with electrical control is used.

As a further alternative embodiment, the balance between the feed rate and the melting rate of the fillet-wire 101 is maintained by regulating the heating current through the wire instead of, or in addition to, regulating the feed rate. Such current regulation is carried out by detecting the contact pressure of the fillet-wire 101 against the work piece 107 and then adjusting the amount of current flow as a function of such pressure, as by controlling a current regulator coupled to the source 113. Hence, the heating current is increased if the pressure exceeds a predetermined threshold value, thereby increasing the melting rate of the fillet-wire 101.

While the present invention has been shown and described with reference to a preferred embodiment, it will be readily apparent that various changes and modifications in form and details can be made by one of ordinary skill in the art without departing from the spirit and scope of the invention. It is, therefore, intended that the appended claims be interpreted as including all such changes and modifications.

What is claimed is:

1. A method of welding comprising the steps of continuously feeding a fillet-wire to a work piece at a welding location; heating both said fillet-wire and said work piece by a flame; passing an electrical heating current through at least a portion of said fillet-wire; and maintaining a predetermined relation between the rate at which said fillet-wire is fed to said work piece and the rate at which said fillet-wire melts, such that said fillet-wire contacts said work piece with a substantially constant pressure.

2. A method of welding comprising the steps of feeding a fillet-wire to a work piece at a welding location; heating both said fillet-wire and said work piece by a flame; passing an electrical heating current through said fillet-wire; and regulating the rate at which said fillet wire is fed to said work piece while maintaining the fillet wire in continuous motion, thereby to compensate for changes in the melting rate of said fillet-wire such that said fillet-wire is maitained in substantially constant contact with said work piece at a predetermined contact pressure.

3. The method of claim 2 wherein the step of regulating the feed rate of said fillet-wire comprises: providing a substantially constant driving force; imparting at least a portion of said driving force to said fillet-wire; and reducing the force imparted to said fillet-wire when said contact pressure exceeds a predetermined level and increasing the force imparted to said fillet-wire when said contact pressure falls below said predetermined level.

4. A method of welding comprising the steps of feeding a fillet-wire to a work piece at a welding location; heating both said fillet-wire and said work piece by a flame; passing an electrical heating current through said fillet-wire; detecting the contact pressure between said fillet-wire and said work piece; and regulating said heating current as a function of the detected pressure to compensate for changes in the relationship between the feed rate and melting rate of said fillet-wire such that said relationship is maintained at equilibrium.

5. Welding apparatus comprising a welding torch producing a flame; a supply of fillet-wire; means including a continuously rotating feed roller for feeding said fillet-wire from said supply to a workpiece whereat said flame heats both said fillet-wire and said work piece; and means for varying the speed of the continuously rotating feed roller to maintain substantial equilibrium between the feed rate and the melting rate of said fillet-wire such that said fillet-wire contacts said work piece with a substantially constant predetermined contact pressure.

6. Welding apparatus comprising a welding torch producing a flame; a supply of fillet-wire; means including a continuously rotating feed roller for feeding said fillet-wire from said supply to a work piece whereat said flame heats both said fillet-wire and said work piece; means for applying a heating current to flow through said fillet-wire; and means for varying the speed of the continuously rotating feed roller to maintain substantial equilibrium between the feed rate and the melting rate of said fillet-wire, whereby a substantially constant predetermined contact pressure between said fillet-wire and said work piece is maintained.

7. Welding apparatus as defined in claim 6 wherein said adjustable feeding means comprises torque-limiting fillet-wire drive means.

8. Welding apparatus comprising a welding torch having a nozzle for producing a flame; a supply of fillet-wire; means for continuously feeding said fillet-wire from said supply through said nozzle to a work piece whereat said flame heats both said fillet-wire and said work piece; means for applying a heating current to flow through said fillet-wire; a feed motor driven at a substantially constant speed; a first clutch disc driven by said feed motor; a second clutch disc frictionally driven by said first clutch disc and adapted to slip with respect thereto; and fillet-wire drive roller means coupled to said second clutch disc, said drive roller means causing said second clutch disc to slip with respect to said first clutch disc but to continue to apply driving torque thereto when the contact pressure between said fillet-wire and said work piece exceeds a predetermined amount.

9. Welding apparatus as defined in claim 8 wherein said fillet-wire is in electrical contact with said nozzle and wherein power supply means is coupled between said nozzle and said work piece to apply said current to said fillet-wire.

10. Welding apparatus comprising a welding torch producing a flame; a supply of fillet-wire; means for feeding said fillet-wire from said supply to a work piece whereat said flame heats both said fillet-wire and said work piece; a feed motor driven at a substantially constant speed; a first clutch disc driven by said feed motor; a second clutch disc in continuous frictional engagement with said first clutch disc and adapted to slip with respect thereto while remaining in said frictional engagement; spring means for applying a force to urge said second clutch disc against said first clutch disc to be driven thereby; and fillet-wire drive roller means coupled to and driven by said second clutch disc for feeding said fillet-wire to said work piece.

11. Welding apparatus as defined in claim 10 wherein said spring means comprises a compression spring disposed between said second clutch disc and adjustable slide means, said slide means being adjustable thereby to vary said force exerted on said second disc by said compression spring.

* * * * *